United States Patent [19]

Cargill et al.

[11] Patent Number: 4,570,782
[45] Date of Patent: Feb. 18, 1986

[54] NON-SYNCHRONOUS ROTARY MANUFACTURING SYSTEM

[75] Inventors: Don A. Cargill, Bloomfield Hills; Lee K. Fisher, Birmingham, both of Mich.

[73] Assignee: Cargill Detroit Corporation, Clawson, Mich.

[21] Appl. No.: 198,525

[22] Filed: Oct. 20, 1980

[51] Int. Cl.$^4$ .............................................. B65G 29/00
[52] U.S. Cl. .................................................. 198/345
[58] Field of Search ............... 198/345, 472, 343, 633, 198/803; 408/71; 289/57, 61

[56] References Cited

U.S. PATENT DOCUMENTS

| | | | |
|---|---|---|---|
| 3,343,645 | 9/1967 | Doerfling | 198/575 X |
| 3,623,599 | 11/1971 | Tillman | 198/803 |
| 3,647,043 | 3/1972 | Garetto | 198/345 |
| 3,708,051 | 1/1973 | Dato et al. | 198/345 |
| 4,253,559 | 3/1981 | Meyers et al. | 198/345 |
| 4,256,221 | 3/1981 | Lain | 198/345 |

Primary Examiner—Jeffrey V. Nase

[57] ABSTRACT

A circular path non-synchronous manufacturing system wherein a continuously rotating horizontal plate or ring driven by a motor reducer combination carries pallets, each with an integral fixture for holding a workpiece, having means for precise location and clamping at automatic work stations. The pallets proceed independently from station to station where they are stopped, located, clamped for the duration of the work operation and released for frictional drive to the next station independent of other pallets which may queue up behind any pallet during its operation in the work station.

8 Claims, 4 Drawing Figures

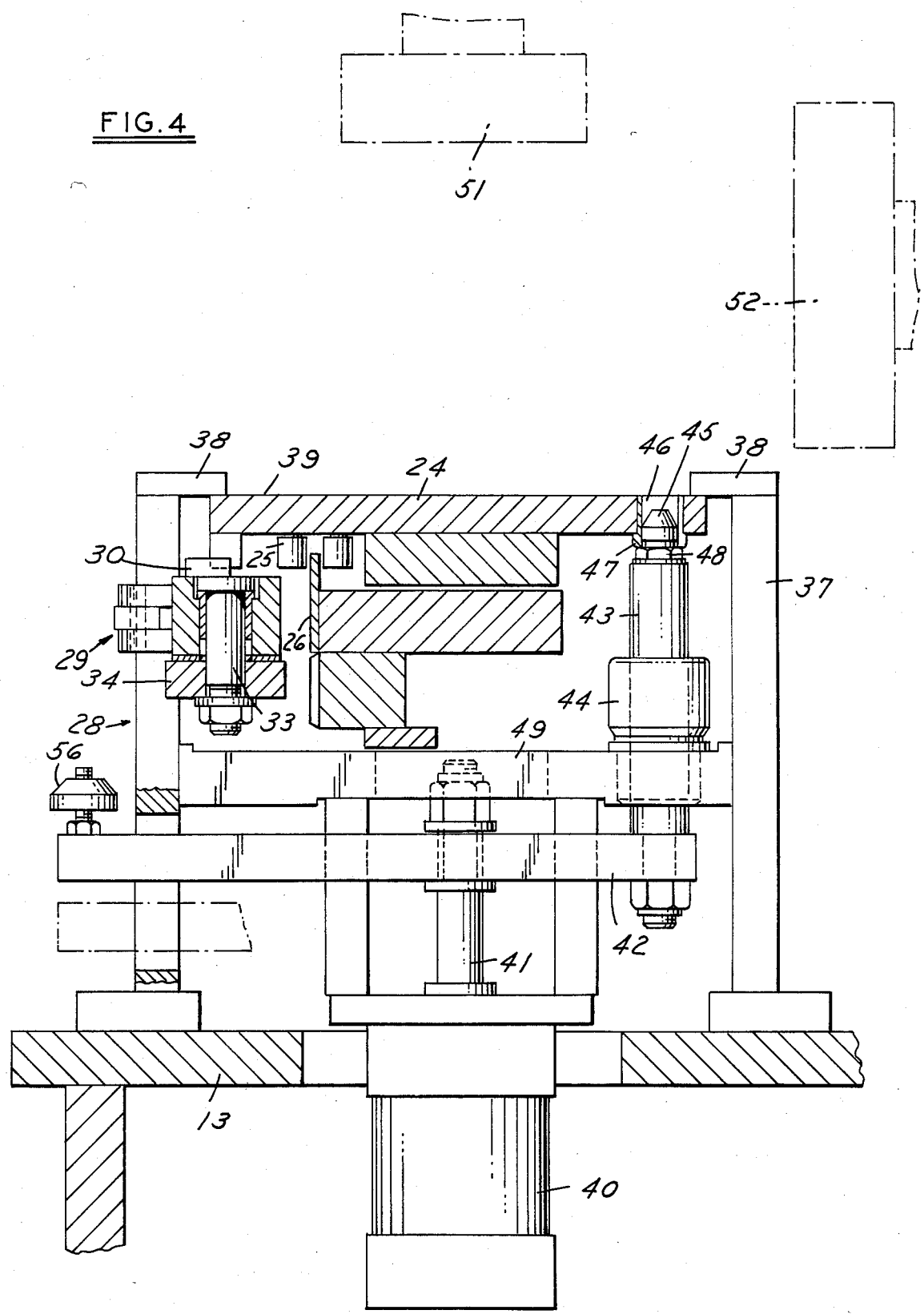

NON-SYNCHRONOUS ROTARY MANUFACTURING SYSTEM

BACKGROUND OF THE INVENTION

The art of sequential manufacturing at successive automated work stations in a rotary path as conventionally practiced involves an integrated rigid multiple station machine and rotatable dial table indexable relative to the respective station locations. Where precision is required between the work operations performed at successive stations, accuracy is normally achieved by precise relative station locations at exact circumferential index increments as well as exact radial location, and workpiece fixtures are rigidly located on the dial table with the exact corresponding circumferential and radial location relative to each of the interrelated stations. Thus, a rigidly integrated composite machine approach involves total dimensional precision and total dimensional interrelationship of all components as well as precise indexing means for the rotatable dial table. In order to achieve both accuracy and rigidity for absorbing the cumulative loads of all working operations the dial table is normally of massive construction involving substantial inertia loads in starting and stopping the table at each index position.

Such conventional approach to multiple station rotary manufacturing systems also involves an integrated common base on which the rigid dimensionally interrelated stations and indexable dial with rigidly located fixtures are mounted. Such approach involves inherent multiple opportunities for tolerance variations—e. g. in station-to-station circumferential dimension; station-to-station location; fixture-to-fixture circumferential dimension; fixture-to-fixture radial dimension; and multiple index locations—all resulting in an inevitable stack up of cumulative tolerance variations. In order to meet demanding requirements for precision in dimensionally interrelated successive operations, highly expensive shop practices are mandated in the assembly of the components—scraping in or shimming component seats, critical adjustments, provisions against warping or strain in set up, elaborate inspection procedures—all add to the costliness of the conventional rigid integrated machine approach.

In addition, a minimum index increment at least adequate for the widest station is required with corresponding index time consumed between stopping one operation and starting the next.

Even where loose pallet, fixture or workpiece individually located at automated stations has been occasionally resorted to, a common indexing approach has been retained imposing constrictions on circumferential spacing of stations and limiting speed of transfer incident to simultaneous indexing.

The closest known prior art relative to applicant's rotary transport system disclosed in a recent search did not involve the problem of accurate interrelation of successive operations or any solution thereto. U.S. Pat. No. 2,507,441 discloses a special purpose glass molding machine employing a pair of separate concentric driven rings for non-synchronous transport of fixturized glass molds with no provision for accurate location or clamping or provision for pallets queuing against each other.

Other patents disclosing various types of rotary apparatus for carrying out work operations include the following: U.S. Pat. Nos. 1,482,687, 2,327,068, 2,447,072, 2,638,201, 2,881,897, 3,180,483, 3,378,907, 3,623,599, 3,647,043, 3,836,003, 4,202,435.

SUMMARY OF THE PRESENT INVENTION

Applicant's system is directed to improve accuracy, productivity and reduce costs of construction relative to the conventional rigid machine system by eliminating tolerance considerations in relative station locations, relative fixture locations as well as indexing locations from affecting the interrelated precision of work operations at successive stations. Thus, by employing a fixturized pallet for holding the workpiece having precision locating means engageable at each automated work station the dimensional interrelationship of the respective stations and workpiece fixtures is rendered immaterial in achieving precise dimensional interrelationship in the successive manufacturing operations on the workpiece; and as long as the workpiece remains fixed to the pallet throughout successive operations, a higher degree of precision can be maintained in the dimensional interrelationship of successive operations than is possible with an intergrated station, dial and fixture approach of the conventional rotary indexing machine.

Productivity is improved by minimizing transfer time to the slowest station, always having a pallet queued in readiness to enter the station immediately upon completion and release of pallet from the slowest station. Relative lightness of weight in moving a single pallet with workpiece into the slowest work station, as compared with indexing the entire massive dial with fixtures and workpieces mounted thereon, permits a more rapid rate of transfer as well as the shorter distance incident to pallet queuing.

Relative to cost, while it might appear that fewer elements are involved in indexing a single dial with a plurality of fixtures rigidly located thereon, the cost of precisely interrelating station and fixture location in coordination with precise indexing leads to a tolerance stack up which makes it far more difficult and costly to achieve a predetermined accuracy relationship between successive operations than is possible with applicant's approach of individualized pallet locations at each automated work station. Optimized circumferential location of the work stations independent of any mandated index increment provides highly desirable flexibility for maximum number of stations within a given circumference. Reduced down time for maintenance is also achieved through accommodating individual fixture repair or replacement on individual pallets while the system remains in operation with the remaining pallets. Minor interruptions for station adjustment or repair can be isolated from continuing operations at the other stations.

Operators at manual stations have the opportunity to work at their average rate with variable float accommodating variations in manual cycle time without affecting operations at the other stations. Finally, fixture replacement is easily accomplished on individual pallets to run another family of parts as well as for repair.

BRIEF DESCRIPTION OF THE DRAWINGS

FIG. 4 is a sectional view taken along the line 4—4 of FIG. 3;

With reference to FIGS. 1 and 2, annular conveyor ring 10 is supported on a plurality of vertical axis rollers 11 mounted on a plurality of pedestals 12 on machine base 13 and guided horizontally in a circular path by a plurality of vertical axis rollers 14. Depending drive ring 15 is secured to ring 10 by bolts 16 with a lower retaining ring 17 extending under rollers 11. Drive pinion 18 extending from gear reducer 19 mounted on base 13 with motor 20, drives gear 15, conveyor ring 10 and pallets 21 frictionally engaging top surface 22 of conveyor ring 10 through pads 23 secured to the underside of pallet plates 24 retained horizontally in approximate radial position by guide rollers 25 extending on either side of guide ring 26 secured to the outside of conveyor ring 10.

Figure 1:
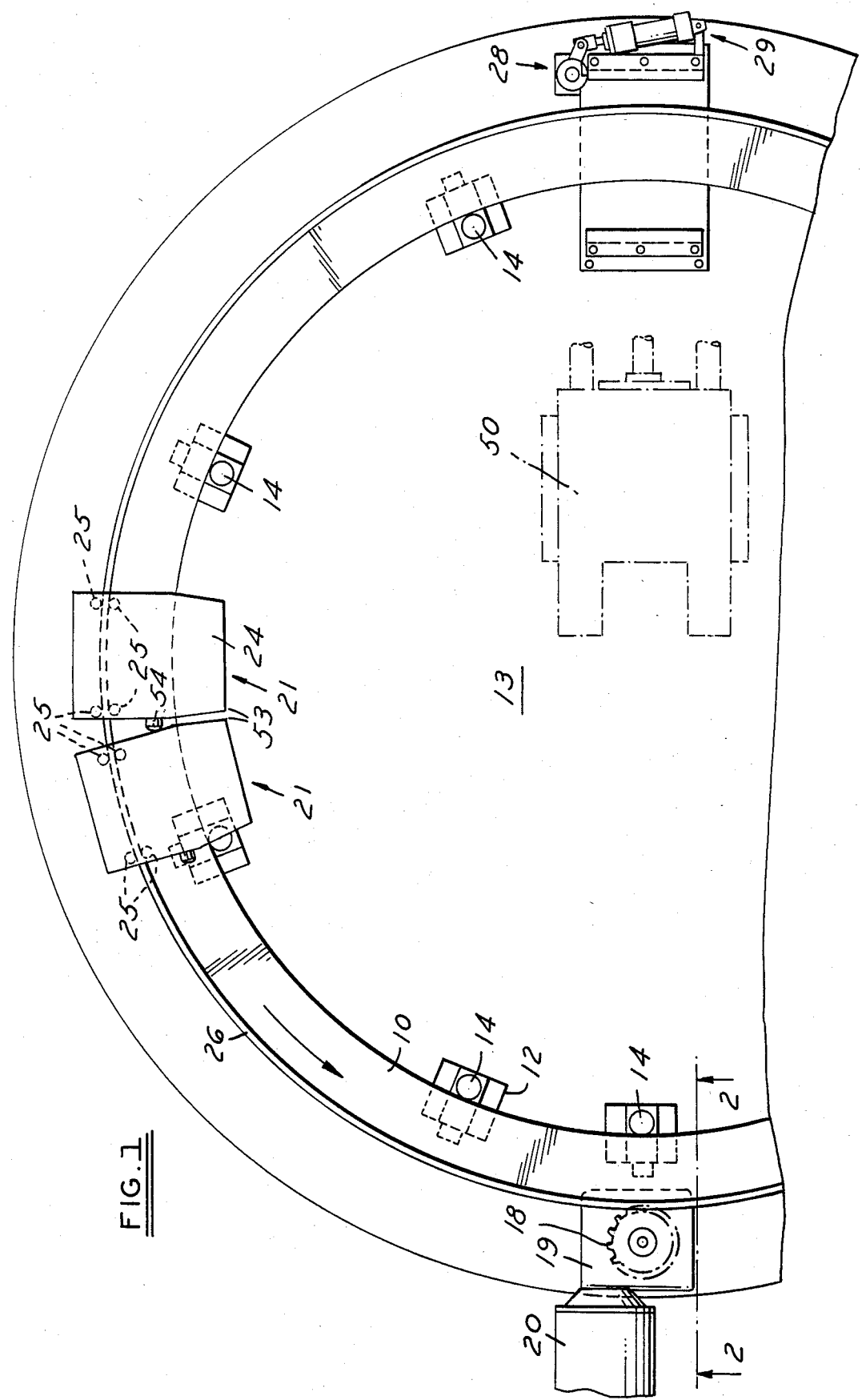
FIG. 1 is a plan view of a rotary path non-synchronous manufacturing system in accordance with the present invention.
Figure 2:
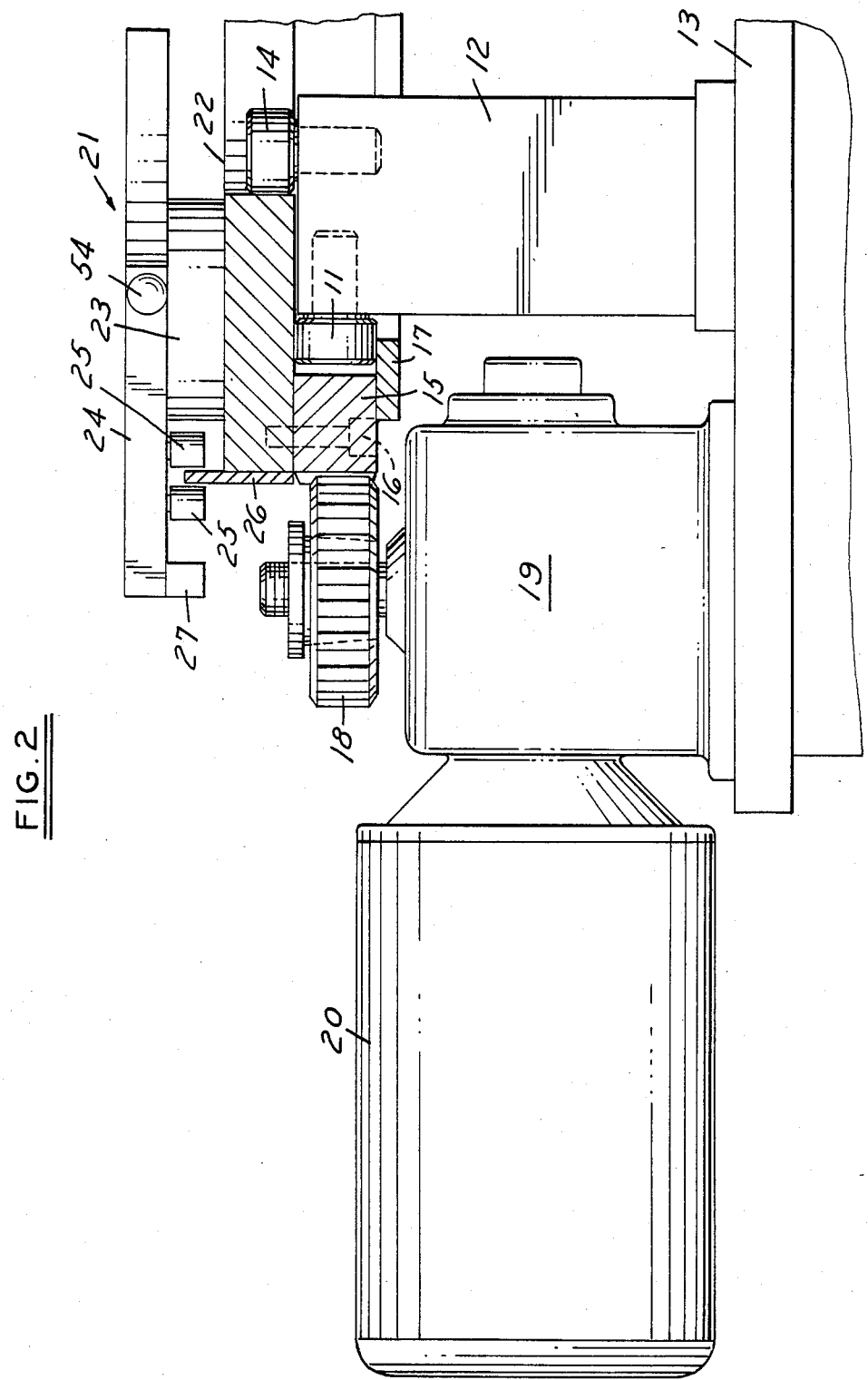
FIG. 2 is an enlarged sectional view taken along the lines 2—2 of FIG. 1.

Depending lug 27 on the outer leading corner of each pallet plate 24 is engageable by a retractable stop, generally indicated at 28, actuated by power cylinder 29 at each work station. As most clearly shown in FIGS. 3 and 4, the retractable stop includes projection 30 extending above cylindrical surface 31 of arm 32 pivotally connected at 33 to fixed support 34 and connected at 35 to the piston rod of power cylinder 29 pivotally anchored to extension 36 to one of the fixed pallet station side plates 37.

Reaction extensions 38 are adapted for engagement by upper side edges 39 of pallet plate 24 when the pallet is raised by power cylinder 40 acting through piston rod 41 secured to cross head 42 having a pair of upstanding precision locating pins 43 passing through precision locating bushings 44 and having tapered locator heads 45 engaging the bore of precision bushings 46 accurately seated at widely spaced positions of pallet plate 24. Collar 47 on each of bushing 46 is engaged by a shoulder of nut 48 to impart clamping pressure to pallet plate 24 against reaction extensions 38 along either side edge of the pallet. Side plates 37 are rigidly connected by cross member 49 on which precision bushings 44 are accurately located to orient each pallet engaged by the precision locators relative to station processing equipment mounted on the machine base 13 such as schematically indicated at 50, 51 and 52.

While station locating framework 37, 49 and processing equipment 50 may be mounted on a common base 13 as shown, it is also possible for such processing equipment and/or pallet station to be free standing with floor mounting subject only to adjustment of locating bushings 44 and reaction extensions 38 to an accurate relationship with the critical axes of the processing equipment at each station where precision orientation is required. It will also be understood that with such precise adjustment at each individual automated work station, there is no need for any accurate radial or circumferential interrelationship between any of the various automated stations or any of the various pallet locating stations since interrelated accuracy is assured by registration of the precision locating pins with pallet bushings from station to station. It will also be understood that by rigidly clamping and retaining a workpiece on the pallet throughout successive interrelated processing operations, even imprecise initial locating of the workpiece in a pallet fixture, as through registration with unmachined casting surfaces, the workpiece may nevertheless end up with precisely interrelated machined surfaces within the rough casting subject only to provision of adequate casting stock to accommodate tolerance in casting locating surfaces.

Figure 3:
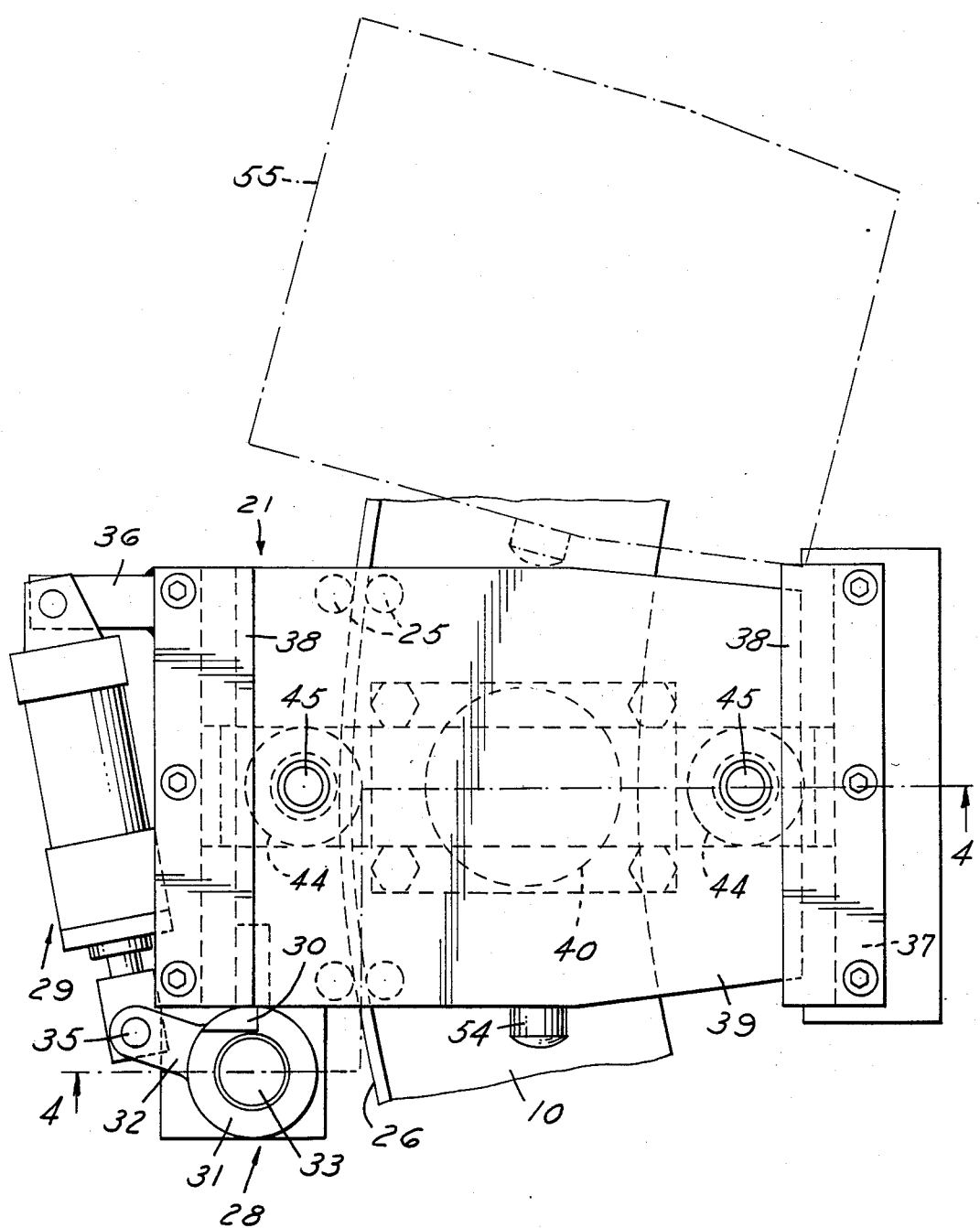
FIG. 3 is an enlarged plan view of one of the pallet stations shown in FIG. 1.

With reference to FIGS. 1 and 3 it will be seen that provision is made for pallet queuing by tapering adjacent surfaces 53 and providing a central contact button 54 on each pallet to engage the trailing edge of a preceding pallet. Such queuing at a work station permits the following pallet 55 to enter a station with minimum transport delay.

With reference to FIG. 4 adjustable cam 56 is provided for actuating a control limit switch (not shown) to start the cycle at an automated work station when the pallet is accurately located and clamped. Such cam being mounted on cross head 42 for movement along with locator pins 43.

While only a single automated work station has been illustrated it will be understood that any number of successive work stations may be placed in the system within approximate size configuration of the ring and with automation equipment located either inside and/or outside of the ring.

We claim:

1. A general rotary path non-sychronous manufacturing system for performing successive accurately interrelated manufacturing operations at successive work stations on production quantities of like workpiece comprising, a plurality of work stations located along a circular path with any desired regular or irregular circumferential spacing, a plurality of fixturized vertically displaceable away from the conveyor surface horizontally unconnected individual workpiece holding pallets each having identical registration means for use in accurately locating and rigidly clamping said pallets at individual work stations, said individual work stations having cooperating accurately locating registration and rigid clamping means for individually orienting and holding each pallet in precise relation to the work operation to be performed on a workpiece held on said pallet, whereby precise relation between successive operations at successive work stations may be accomplished regardless of circumferential spacing and variations in relative radial spacing of respective stations to each other and said circular path, continuously rotating conveyor means for solely supporting and transporting said pallets along said circular path with pallet driving force supplied solely through gravity actuated frictional supporting engagement, retractable means at each work station for stopping a pallet and removing it from said supporting and frictional engagement preparatory to said accurate locating and rigid clamping, and for permitting reengagement of conveyor support and frictional transport upon completion of the work operation, and adjacent pallet interengaging means for queuing successive pallets approaching an occupied work station.

2. A system as set forth in claim 1 including fixed rail means at a work station for engaging upper edge surfaces of a pallet to achieve said rigid clamping, together with power cylinder means for raising a pallet into clamping engagement with said rails.

3. A system as set forth in claim 2 including interengaging bushing and locating pin means for horizontally orienting said pallet and clamping same against said fixed rail means.

4. A system as set forth in claim 3 including precision bushings in said pallet and fixed precision bushing means for guiding precision pin locating means raised into locating engagement with said pallet bushings.

5. A system as set forth in claim 1 wherein said conveyor means is provided with an annular lateral guide ring with cooperating guide engaging means on said pallet for retaining said pallet in approximate required radial position during transport.

6. A system as set forth in claim 1 wherein said conveyor means include a depending annular gear and interengaging drive pinion means for continuously rotating said conveyor means.

7. A system as set forth in claim 1 including centrally interengaging contact means between adjacent pallets adapted to queue following pallets against a pallet during its stationary location at a work station.

8. A system as set forth in claim 1 wherein said conveyor means is constructed in the form of a conveyor ring and includes a plurality of pedestals with horizontal and vertical axis rollers for engaging respectively under and annular surfaces of said ring.

* * * * *